(12) United States Patent
Noda

(10) Patent No.: US 7,031,472 B1
(45) Date of Patent: Apr. 18, 2006

(54) METHOD OF AUTHENTICATING INFORMATION, DISK PLAYBACK APPARATUS, AND ENTERTAINMENT APPARATUS

(75) Inventor: Shinji Noda, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 09/404,427

(22) Filed: Sep. 23, 1999

(30) Foreign Application Priority Data

Sep. 25, 1998 (JP) .............................. 10-272144
Sep. 6, 1999 (JP) .............................. 11-252295

(51) Int. Cl.
*H04N 7/167* (2006.01)
*H04L 9/00* (2006.01)
*G06F 11/30* (2006.01)

(52) U.S. Cl. .................. 380/232; 380/200; 713/167; 713/169; 713/193; 726/2

(58) Field of Classification Search ........ 380/200–242; 705/57–59; 713/200; 726/2
See application file for complete search history.

(56) References Cited

U.S. PATENT DOCUMENTS

| 5,159,634 | A | 10/1992 | Reeds, III |
| 5,311,596 | A | 5/1994 | Scott et al. |
| 5,572,507 | A | 11/1996 | Ozaki et al. |
| 5,599,231 | A | 2/1997 | Hibino et al. |
| 5,608,778 | A | 3/1997 | Partridge, III |
| 5,659,613 | A | 8/1997 | Copeland et al. |
| 5,724,327 | A | 3/1998 | Timmermans et al. |

(Continued)

FOREIGN PATENT DOCUMENTS

EP       0 084 441       7/1983

(Continued)

OTHER PUBLICATIONS

Official Notification on the Prolongation of the Term for Filing Official Response to the Advisory Office Action for 1 month &Resolution on Granting the Patent of the Invention of Sep. 7, 2004 issued on the corresponding Russian Patent Application No. 99120665/28(021526), and the English translations of the same.

*Primary Examiner*—Kambiz Zand
(74) *Attorney, Agent, or Firm*—Frommer Lawrence & Haug LLP; William S. Frommer; Samuel S. Lee

(57) ABSTRACT

A playback instructing unit in a disk playback controller has a function to instruct a CPU to play back an optical disk at different access positions in an absolute authentication process and an arbitrary authentication process. An absolute decision unit has a function to be activated by an absolute authentication instruction from the playback instructing unit and authenticate the decided result from an authentication decision means according to a first rule (which declares normal authentication based on a normal decision). An arbitrary decision unit has a function to be activated by an arbitrary authentication instruction from the playback instructing unit and authenticate the decided result from the authentication decision unit according to a second rule (which declares normal authentication based on an abnormal decision). Even if a special device which can normally authenticate an optical disk that should not be authenticated normally is connected to a disk access mechanism, the optical disk that should not be authenticated normally or the special device can reliably be detected to forcibly interrupt any process being carried out, so that the optical disk can effectively be prevented from being illegally copied.

26 Claims, 12 Drawing Sheets

U.S. PATENT DOCUMENTS

| | | | |
|---|---|---|---|
| 5,737,286 A * | 4/1998 | Timmermans et al. | 369/44.13 |
| 5,805,551 A | 9/1998 | Oshima et al. | |
| 5,809,006 A | 9/1998 | Davis et al. | |
| 5,930,210 A | 7/1999 | Timmermans et al. | |
| 6,122,739 A * | 9/2000 | Kutaragi et al. | 713/200 |
| 6,363,164 B1 * | 3/2002 | Jones et al. | 382/135 |

FOREIGN PATENT DOCUMENTS

| | | |
|---|---|---|
| EP | 0671730 | 9/1995 |
| EP | 0 901 123 A | 3/1999 |
| GB | 2 230 365 A | 10/1990 |
| JP | 04-195278 | 7/1992 |
| JP | 5-325193 | 12/1993 |
| JP | 6 28316 | 2/1994 |
| JP | 6 188877 | 7/1994 |
| JP | 6 204998 | 7/1994 |
| JP | 7-272282 | 10/1995 |
| JP | 8 96043 | 4/1996 |
| JP | 8 147704 | 6/1996 |
| JP | 08-185445 | 7/1996 |
| JP | 9 97216 | 4/1997 |
| JP | 10-161979 | 6/1998 |
| JP | 10 247144 | 9/1998 |
| RU | 2 077 113 C1 | 4/1997 |
| WO | 92/04671 | 3/1992 |

* cited by examiner

METHOD OF AUTHENTICATING INFORMATION, DISK PLAYBACK APPARATUS, AND ENTERTAINMENT APPARATUS

BACKGROUND OF THE INVENTION

1. Field of the Invention

The present invention relates to a method of authenticating playback information reproduced from a disk-type recording medium, a disk playback apparatus for playing back a disk-type recording medium, and an entertainment apparatus which uses information reproduced from a disk-type recording medium.

2. Description of the Related Art

In recent years, disk-type recording mediums which store information recorded as pits according to a predetermined format are finding use as major information storage mediums. One of the features of the disk-type recording mediums is that they have a large information storage capacity.

Some of the disk-type recording mediums, which are in widespread use, incorporate an information protection measure to protect the stored information against unauthorized duplication. Those disk-type recording mediums are protected to prevent the stored information from being copied without the consent of the author.

Protected disk-type recording mediums are played back by a dedicated disk playback apparatus.

Before the disk playback apparatus plays back a protected disk-type recording medium, the disk playback apparatus decides whether a predetermined code for protecting stored information, i.e., a security code, has been written in the protected disk-type recording medium or not. Stated otherwise, the disk playback apparatus plays back a protected disk-type recording medium after confirming that the protected disk-type recording medium is a legitimate disk. Such a disk playback system is generally known as a security system.

There have been illegal attempts to reproduce information from non-protected disk-type recording mediums with a special device attached to a disk playback apparatus.

Heretofore, it has been customary to read a security code written in a certain area on a protected disk-type recording medium loaded in the disk playback apparatus thereby to authenticate that protected disk-type recording medium is a legitimate disk. The above special device operates as if it could read a security code though it is in fact incapable of reading the data of the security code, so that it can authenticate a disk-type recording medium which should not be authenticated in reality.

Using the above special device, an illegally copied disk-type recording medium which should not be authenticated can be authenticated in an authenticating process when it is to be played back, and can be played back by a disk playback apparatus to which the special device is connected.

SUMMARY OF THE INVENTION

It is therefore an object of the present invention to provide a method of authenticating information to reliably detect a disk-type recording medium itself which should not be authenticated or a special device that may have been attached to a disk playback apparatus for authenticating the disk-type recording medium which should not be authenticated, for thereby stopping any process that is being carried out, and to effectively prevent the disk-type recording medium which should not be authenticated from being illegally copied.

Another object of the present invention is to provide a disk playback apparatus having an authenticating means for performing the above method of authenticating information to reliably detect a disk-type recording medium itself which should not be authenticated or a special device that may have been attached to a disk playback apparatus for authenticating the disk-type recording medium which should not be authenticated, for thereby stopping any process that is being carried out, and to effectively prevent the disk-type recording medium which should not be authenticated from being illegally copied.

Still another object of the present invention is to provide an entertainment apparatus having an authenticating means for performing the above method of authenticating information to reliably detect a disk-type recording medium itself which should not be authenticated or a special device that may have been attached to a disk playback apparatus for authenticating the disk-type recording medium which should not be authenticated, for thereby stopping the execution of a program or the like read from the disk-type recording medium.

A method of authenticating information according to the present invention comprises the steps of performing an absolute authentication process for authenticating a recording medium with information for authentication being recorded in a predetermined position therein, according to a first rule at a predetermined time, and performing an arbitrary authentication process for authenticating the recording medium according to a second rule at an arbitrary time.

A disk playback apparatus for playing back information on a disk-type recording medium according to the present invention comprises absolute authentication means for performing an absolute authentication process for authenticating a recording medium with information for authentication being recorded in a predetermined position therein, according to a first rule at a predetermined time, and arbitrary authentication means for performing an arbitrary authentication process for authenticating the recording medium according to a second rule at an arbitrary time.

An entertainment apparatus for performing processing operations using programs and data reproduced from a recording medium according to the present invention comprises absolute authentication means for performing an absolute authentication process for authenticating a recording medium with information for authentication being recorded in a predetermined position therein, according to a first rule at a predetermined time, and arbitrary authentication means for performing an arbitrary authentication process for authenticating the recording medium according to a second rule at an arbitrary time.

First, the absolute authentication process is performed according to the first rule at the predetermined time, and if the absolute authentication process results in normal authentication, then the arbitrary authentication process is performed according to the second rule at the arbitrary time.

Even if a special device for nullifying a disk protection capability is connected to an apparatus for playing back a disk-type recording medium, i.e., a disk playback apparatus, to nullify the absolute authentication process, since the arbitrary authentication process is performed at the arbitrary time and according to the second rule which is different from the first rule in the absolute authentication process, the arbitrary authentication process cannot be nullified by the special device.

If an illegally copied disk-type recording medium is to be played back by the disk playback apparatus without the special device connected thereto, then the absolute authentication process detects the disk-type recording medium as being illegally copied, and the disk playback apparatus does not play back the disk-type recording medium.

If an illegally copied disk-type recording medium is to be played back by the disk playback apparatus with the special device connected thereto for executing a program recorded in the disk-type recording medium, then the arbitrary authentication process detects the disk-type recording medium as being illegally copied or detects the special device as being connected, and forcibly ends the program being executed.

Therefore, even if the special device which can authenticate a disk-type recording medium that should not be authenticated is connected to the disk playback apparatus, the disk-type recording medium that should not be authenticated or the special device can reliably be detected, and any process being performed can be stopped, so that the disk-type recording medium can effectively be prevented from being copied.

The absolute authentication process may be performed when the disk-type recording medium starts being accessed for the first time, and the arbitrary authentication process may be performed at least once after the absolute authentication process.

The first rule in the absolute authentication process may be that normal authentication is declared if the information for authentication is detected as being recorded in the predetermined position, and the second rule in the arbitrary authentication process may be that normal authentication is declared if the information for authentication is detected as being not recorded.

The absolute authentication process may comprise an authentication information detecting process for detecting the information recorded in the predetermined position when the recording medium starts being accessed, and an absolute decision process for declaring normal authentication if the detected information comprises information for authentication, and the arbitrary authentication process may comprise an arbitrary information detecting process for detecting information from an arbitrary position except the predetermined position on the recording medium, and an arbitrary decision process for declaring normal authentication if the detected information does not comprise information for authentication.

The first rule in the absolute authentication process may be that normal authentication is declared if a signal indicating that the information for authentication is recorded in the predetermined position is received, and the second rule in the arbitrary authentication process may be that normal authentication is declared if a signal indicating that the information for authentication is not recorded is received.

The method may further comprise the step of employing access means for accessing the recording medium and outputting a normal signal if the information for authentication is recorded in the predetermined position, the absolute authentication process may comprise an absolute decision process for declaring normal authentication if the normal signal is received, and the arbitrary authentication process may comprise an arbitrary decision process for declaring an abnormal authentication if the normal signal is received.

The information for authentication may be modulated radially of the recording medium and recorded therein.

The recording medium may comprise a disk-type recording medium, the information for authentication being modulated radially of the recording medium and recorded therein, and the absolute authentication process and the arbitrary authentication process may comprise the steps of detecting a modulated component from the recording medium, detecting the information for authentication from the modulated component, and deciding whether the detected information for authentication is in agreement with predetermined information and recorded in the predetermined position, and outputting a normal signal if the detected information for authentication is in agreement with predetermined information and recorded in the predetermined position.

The access means may comprise means for performing the steps of detecting a modulated component from the recording medium, detecting the information for authentication from the modulated component, and deciding whether the detected information for authentication is in agreement with predetermined information and recorded in the predetermined position, and outputting a normal signal if the detected information for authentication is in agreement with predetermined information and recorded in the predetermined position.

The method may further comprise the step of forcibly ending a processing being executed if either the absolute authentication process or the arbitrary authentication process does not result in normal authentication. The method may further comprise the step of displaying information representing an authenticated result of either the absolute authentication process or the arbitrary authentication process before the process being executed is forcibly ended.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A video game apparatus, which incorporates the principles of a method of authenticating information, a disk playback apparatus, and an entertainment apparatus according to the present invention, will be described below with reference to FIGS. 1 through 12.

Figure 1:
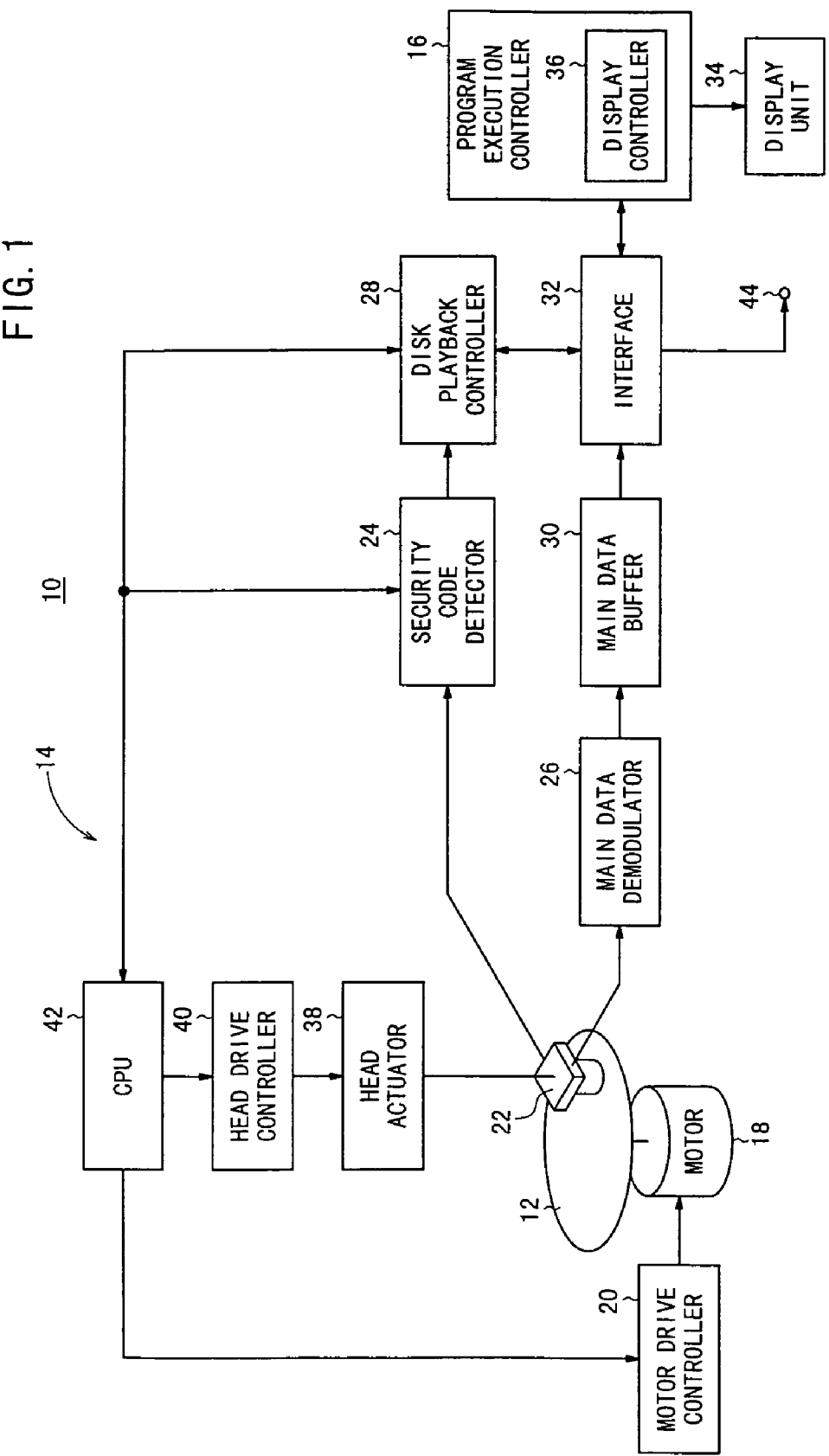
FIG. 1 is a block diagram of a video game apparatus according to the present invention.

The video game apparatus, generally designated by the reference numeral 10 in FIG. 1, uses a disk-type recording medium which may comprise a CD-ROM, a CD-R, a DVD, a DVD-R, or the like. The disk-type recording medium will hereinafter be referred to as an "optical disk".

As shown in FIG. 1, the video game apparatus 10 has a disk access mechanism 14 for accessing an optical disk 12 and reading various programs and various data from the optical disk 12, and a program execution controller 16 for receiving various programs and various data from the disk access mechanism 14 and controlling the execution of the programs according to predetermined processing sequences.

The disk access mechanism 14 has a spindle motor 18 for rotating the optical disk 12 about its own axis, a motor drive controller 20 for controlling the spindle motor 18, and an optical pickup 22 for optically reading data recorded in the optical disk 12 and outputting an electric RF (Radio Frequency) signal representing the read data.

The RF signal contains wobbling data produced by radial wobbling movement of pits and grooves recorded in the optical disk 12, and main data (programs and data) represented by the pits recorded in the optical disk 12.

The disk access mechanism 14 also has a security code detector 24 for extracting a security code for authentication from the RF signal from the optical pickup 22, and a main data demodulator 26 for demodulating the RF signal from the optical pickup 22 into the main data.

The disk access mechanism 14 also includes a disk playback controller 28 for checking the security code against a predetermined code and controlling playback operation based on the checked result, a main data buffer 30 for holding the main data from the main data demodulator 26, and an interface 32 for exchanging data depending on the type of the main data.

The program execution controller 16 has a display controller 36 for displaying information relative to at least authentication on a display unit 34.

The optical pickup 22 can be moved radially across the optical disk 12 by a head actuator 38 which is controlled by a head drive controller 40.

The motor drive controller 20, the head drive controller 40, the security code detector 24, and the disk playback controller 28 are controlled by a CPU (Central Processing Unit) 42.

The video game apparatus 10 operates as follows: The optical pickup 22 optically reads data recorded in the optical disk 12 and outputs the read data as an RF signal to a circuit system at a later stage. The security code detector 24 detects a security code from wobbling data, and then checks the security code against a predetermined code. The disk playback controller 28 controls playback operation based on the checked result from the security code detector 24.

The main data demodulator 26 reads main data and delivers the main data via the main data buffer 30 and the interface 32 to the program execution controller 16. The program execution controller 16 controls the execution of a program relative to the supplied main data, and controls the display controller 36 to display an image of authentication information on the display unit 34.

The motor drive controller 20 is controlled by the CPU 42 to energize the spindle motor 18 to rotate the optical disk 12. The head drive controller 40 is controlled by the CPU 42 to enable the head actuator 38 to move the optical pickup 22 radially across the optical disk 12.

In FIG. 1, the main data is recorded on the optical disk 12 as a train of pits modulated according to the EFM (Eight to Fourteen Modulation) code, for example, which is a modulation scheme for digital audio discs.

If the optical disk 12 is a disk obtained through a normal channel (hereinafter referred to as a "legitimate disk"), then bits or grooves are radially wobbled in a fully circumferential or partial signal area on the optical disk 12 according to a modulation process with a carrier using a 22.05 kHz signal in the NRZ (Non-Return-to-Zero) form.

The optical disk 12 is rotated at a predetermined linear velocity, for example, by the spindle motor 18. The spindle motor 18 which rotates the optical disk 12 is controlled by the motor drive controller 20. The motor drive controller 20 energizes the spindle motor 18 based on a control signal from the CPU 42.

The 22.05 kHz signal of the carrier is a signal having a frequency which is one-half of a sampling frequency (44.1 kHz) for compact disks (CDs). Predetermined information for authentication, i.e., a security code, is recorded in a multiple manner in a TOC (Table Of Contents) area of the radially wobbled component.

The security code may have data of several bytes, and has a code common to different apparatus, an area code indicative of a geographical area where the legitimate disk is played back, and an individual code assigned individually to each legitimate disk. If the optical disk 12 is not a legitimate disk, then no security code is written in the optical disk 12.

The optical pickup 22 detects an RF signal from the optical disk 12 which is rotated by the spindle motor 18, and sends the detected RF signal to the security code detector 24 and the main data demodulator 26.

The optical pickup 22 is moved radially across the optical disk 12 by the head actuator 38. The head actuator 38 moves the optical pickup 22 to a desired position radially of the optical disk 12. The head drive controller 40 controls the head actuator 38 based on a control signal from the CPU 42.

The security code detector 24 serves to detect a security code from the RF signal from the optical disk 12. Specifically, the security code detector 24 detects the carrier component of 22.05 kHz from the RF signal, extracts wobbling data superposed on the carrier component, and detects a code from the wobbling data. The security code detector 24 decides whether the detected code is a security code or not.

The disk playback controller 28 issues a start-of-authentication command and an end-of-authentication command to the CPU 42. The CPU 42 controls the detecting process of the security code detector 24 based on the start-of-authentication command, and controls the security code detector 24 to output the decided result to the disk playback controller 28 based on the end-of-authentication command.

The disk playback controller 28 controls the playback of the optical disk 21 based on a control signal from the CPU 42 and the decided result of the security code detector 24.

The main data demodulator 26 sends main data produced when the RF signal is demodulated by EFM to the main data buffer 30. The main data buffer 30 temporarily stores the main data, and sends the main data via the interface 32 to the program execution controller 16 in response to a control signal from the disk playback controller 28. If the main data is an audio signal, then the interface 32 outputs the audio signal to an audio signal output terminal 44.

The program execution controller 16 serves to control the execution of a program. The display controller 36 of the program execution controller 16 controls the display of images on the display unit 34 in certain instances, as described later on.

The display unit 34 comprises an image display device having a liquid crystal display panel or the like, and displays images based on display data obtained by the program execution controller 16.

The security code detector 24 and the disk playback controller 28 may not be independent components, but may be arranged as a functional block of the CPU 42.

A characteristic function of the video game apparatus 10 will be described below.

The characteristic function of the video game apparatus 10 is to authenticate the optical disk 12 with information for authentication recorded therein at a predetermined position, according to a first rule at a predetermined time (absolute authentication process), and to authenticate the optical disk 12 according to a second rule at an arbitrary time (arbitrary authentication process). This function is performed by an authenticating means 100 shown in FIG. 2.

The authenticating means 100 will be described below with reference to FIGS. 2 and 3.

Figure 2:
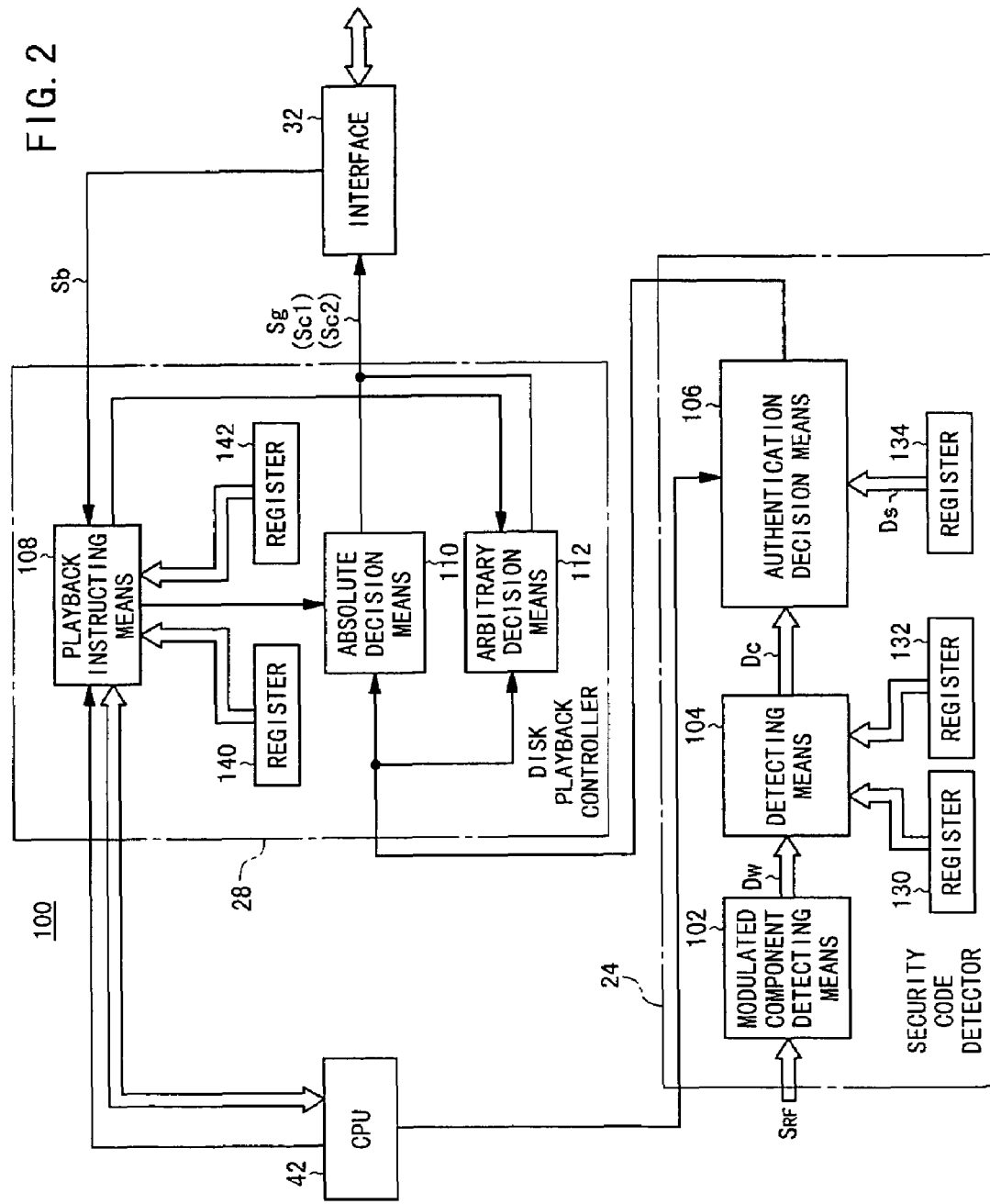
FIG. 2 is a block diagram of a security code detector and a disk playback controller which are incorporated in a disk access mechanism of the video game apparatus.

As shown in FIG. 2, the authenticating means 100 comprises a modulated component detecting means 102, a detecting means 104, and an authentication decision means 106 which are included in the security code detector 24, and a playback instructing means 108, an absolute decision means 110, and an arbitrary decision means 112 which are included in the disk playback controller 28. As shown in FIG. 3, the authenticating means 100 also comprises an arbitrary authentication activating means 114, a program executing means 116, an authentication signal decision means 118, and a forced ending means 120 which are included in the program execution controller 16.

The modulated component detecting means 102 has a function to demodulate an RF signal $S_{RF}$ read from the optical disk 12 to read wobbling data Dw. The detecting means 104 has a function to detect a code Dc recorded in a position based on positional data stored in a first register 130 or a second register 132, from the read wobbling data. The authentication decision means 106 has a function to decide whether the detected code Dc is in agreement with a security code Ds stored in a register 134, and output the decided result.

The playback instructing means 108 has a function to instruct the CPU 42 to play back the optical disk 12 at different access positions in an absolute authentication process and an arbitrary authentication process. The absolute decision means 110 has a function to be activated by an absolute authentication instruction from the playback instructing means 108 and authenticate the decided result from the authentication decision means 106 according to the first rule. The arbitrary decision means 112 has a function to be activated by an arbitrary authentication instruction from the playback instructing means 108 and authenticate the decided result from the authentication decision means 106 according to the second rule.

The first rule is that normal authentication is declared if the decided result from the authentication decision means 106 is normal and abnormal authentication is declared if the decided result from the authentication decision means 106 is abnormal. Conversely, the second rule is that normal authentication is declared if the decided result from the authentication decision means 106 is abnormal and abnormal authentication is declared if the decided result from the authentication decision means 106 is normal.

When the optical disk 12 starts to be accessed for the first time, the playback instructing means 108 reads an access position stored in a first register 140 and issues the read access position as a seek command to the CPU 42 based on an instruction from the CPU 42 in order to carry out the absolute authentication process.

The CPU 42 supplies information such as the access position contained in the seek command from the playback instructing means 108 to the head drive controller 40 (see FIG. 1), and outputs a start signal to the motor drive controller 20. Based on the start signal, the motor drive controller 20 energizes the spindle motor 18. Based on the information from the CPU 42, the head drive controller 40 controls the head actuator 38 to move the optical pickup 22 radially across the optical disk 12 to the access position represented by the information.

Figure 3:
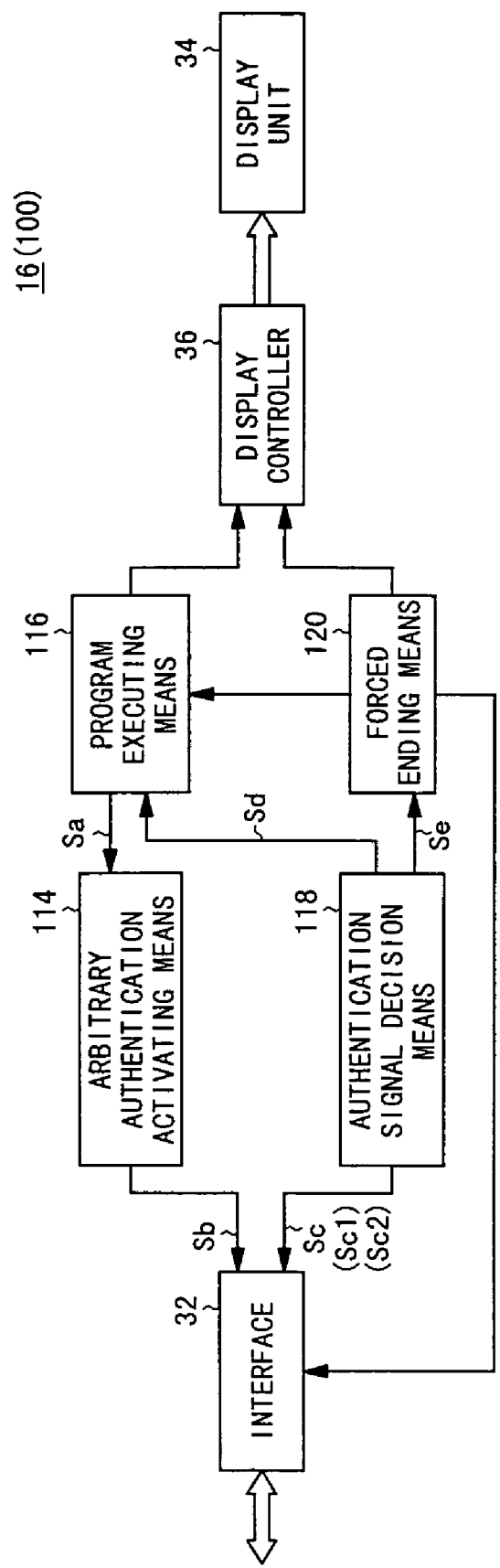
FIG. 3 is a block diagram of a program execution controller of the video game apparatus.

As shown in FIG. 3, the program executing means 116 has a function to execute various programs. For example, if the absolute authentication process results in normal authentication, then the program executing means 116 transfer main data sent via the interface to a main memory (not shown), and executes a program transferred to the main memory. In addition, if the absolute authentication process results in normal authentication, then the program executing means 116 continues to execute a program that is being activated. Furthermore, the program executing means 116 periodically or temporarily outputs an activation instruction signal Sa to the arbitrary authentication activating means 114.

In response to the activation instruction signal Sa from the program executing means 116, the arbitrary authentication activating means 114 outputs an enable signal Sb indicative of a start of execution of the arbitrary authentication process to the playback instructing means 108 shown in FIG. 2.

The authentication signal decision means 118 determines an authentication signal Sc from the absolute decision means 110 or the arbitrary decision means 112, and outputs a signal Sd indicative of the execution/continuation of a program or a signal Se indicative of the forced ending of a program.

Specifically, when the authentication signal decision means 118 is supplied with a signal Sc1 indicative of normal authentication from the absolute decision means 110 and the arbitrary decision means 112, the authentication signal decision means 118 outputs a signal Sd indicative of the execution/continuation of a program to the program executing means 116. When the authentication signal decision means 118 is supplied with a signal Sc2 indicative of abnormal authentication from the absolute decision means 110 and the arbitrary decision means 112, the authentication signal decision means 118 outputs a signal Se indicative of the forced ending of a program to the forced ending means 120.

In response to the signal Se indicative of the forced ending from the authentication signal decision means 118, the forced ending means 120 causes the program executing means 116 to generate an interrupt for the forced ending, forcibly ending the program which is being executed at present.

Based on the enable signal Sb from the arbitrary authentication activating means 114 and an instruction from the CPU 42, the playback instructing means 108 reads an access position stored in a second register 142 and issues the access position as a seek command to the CPU 42 in order to carry out the arbitrary authentication process.

As in the absolute authentication process, the CPU 42 supplies information such as the access position contained in the seek command from the playback instructing means 108 to the head drive controller 40 (see FIG. 1), and outputs a start signal to the motor drive controller 20. Based on the start signal, the motor drive controller 20 energizes the spindle motor 18. Based on the information from the CPU 42, the head drive controller 40 controls the head actuator 38 to move the optical pickup 22 radially across the optical disk 12 to the access position represented by the information.

In the arbitrary authentication process, the detecting means 104 detects a code Dc recorded in an access position based on positional data (data indicative of the access position stored in the second register 142) stored in the second register 132.

Since the code Dc detected by the detecting means 104 is different from the security code Ds stored in the register 134 associated with the authentication decision means 106, the authentication decision means 106 outputs a decided result representing abnormal decision.

However, because the arbitrary decision means 112 outputs a signal Sc1 representing normal authentication according to the second rule when the decided result from the authentication decision means 106 represents abnormal decision, the program execution controller 16 carries out a normal process. That is, the authentication signal decision means 118 outputs a signal Sd indicative of the execution/continuation of a program to the program executing means 116.

Processing operation of the authenticating means 100 will be described below with reference to FIGS. 4 through 8.

Figure 4:
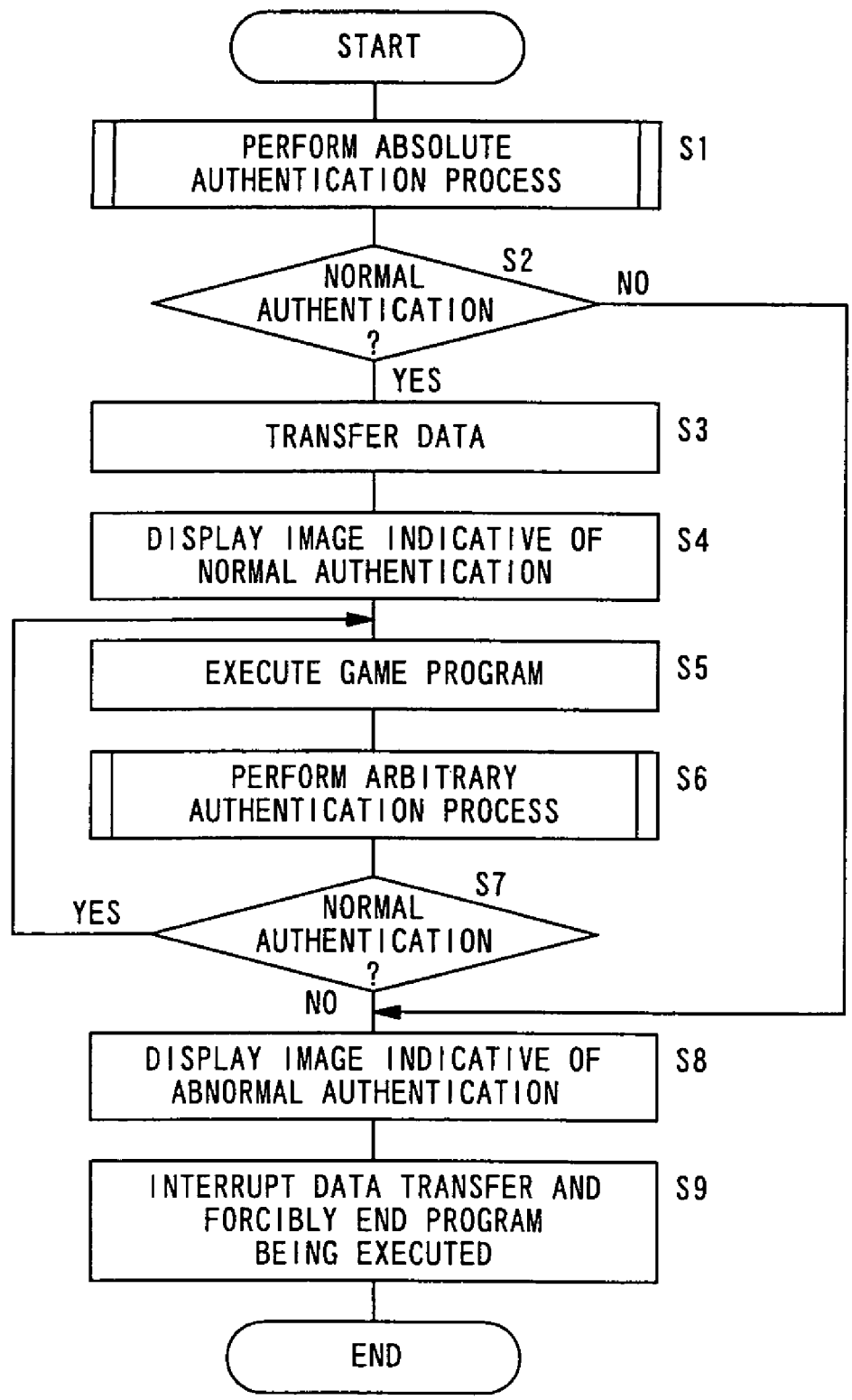
FIG. 4 is a flowchart of a processing sequence of an authenticating means.

The authenticating means 100 executes the absolute authentication process in step S1 shown in FIG. 4.

The absolute authentication process will be described below with reference to FIGS. 5 and 6.

Figure 5:
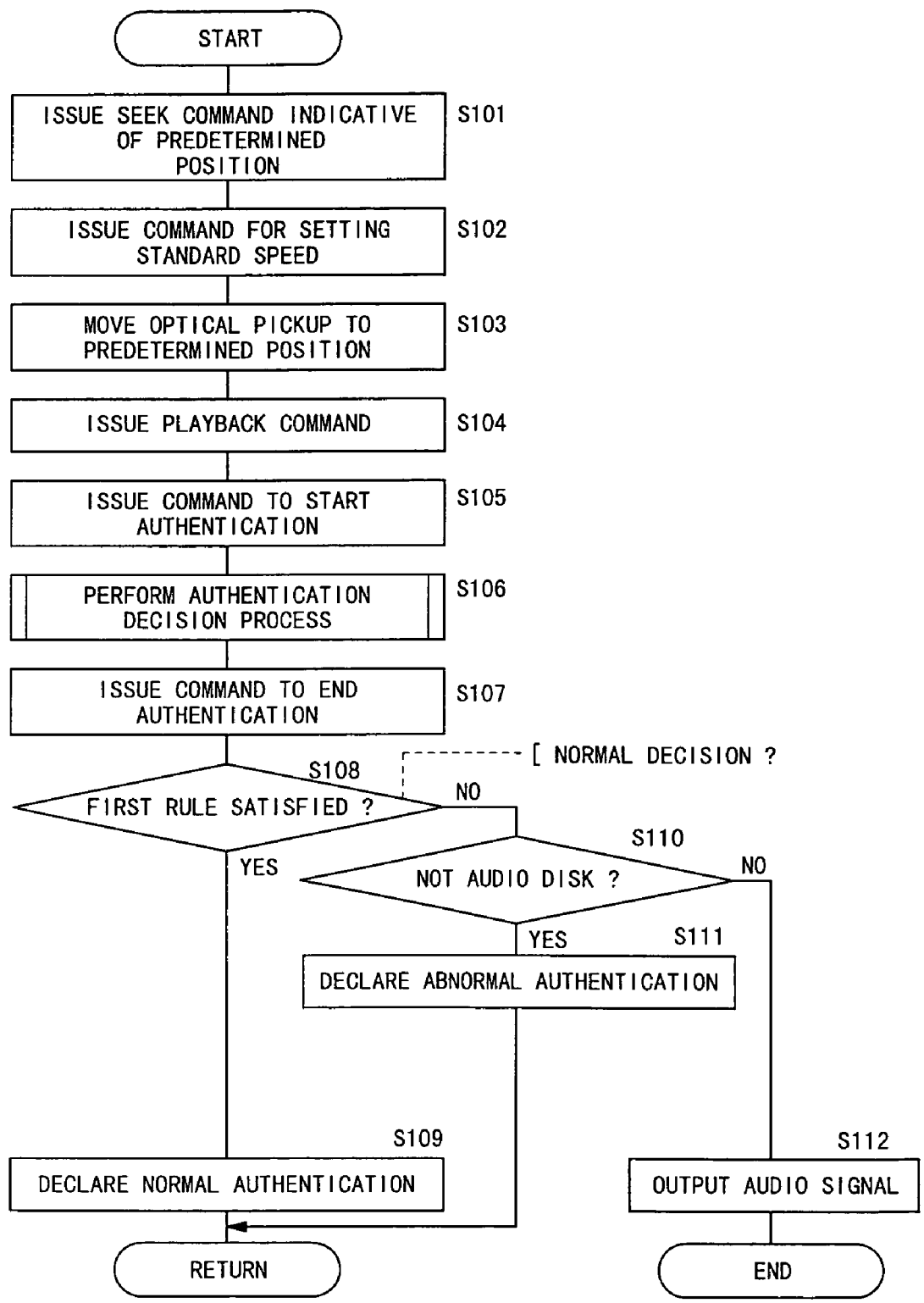
FIG. 5 is a flowchart of an absolute authentication process.

In step S101 shown in FIG. 5, the playback instructing means 108 indicates a given start position (an access position stored in the first register 140) on a recording track of the optical disk 12, and issues a seek command for causing the optical pickup 22 to seek the access position to the CPU 42.

Then, in step S102, the disk playback controller 28 issues a rotation command for setting a mode of the CPU 42 to a standard speed to the CPU 42.

In step S103, the CPU 42 controls the motor drive controller 20 to energize the spindle motor 18 based on the rotation command issued in step S102. The CPU 42 also controls the head drive controller 40 based on the seek command issued in step S101 to cause the head actuator 38 to move the optical pickup 22 radially across the optical disk 12 until the optical pickup 22 moves to the start position indicated by the seek command.

Then, the disk playback controller 28 issues a playback command to the CPU 42 to play back the optical disk 12 from the indicated start position in step S104. In step 105, the disk playback controller 28 issues a command to start authentication to the CPU 42.

In step S106, an actual authentication decision process is performed on the basis of the command to start authentication. FIG. 6 shows a processing sequence of the authentication decision process.

Figure 6:
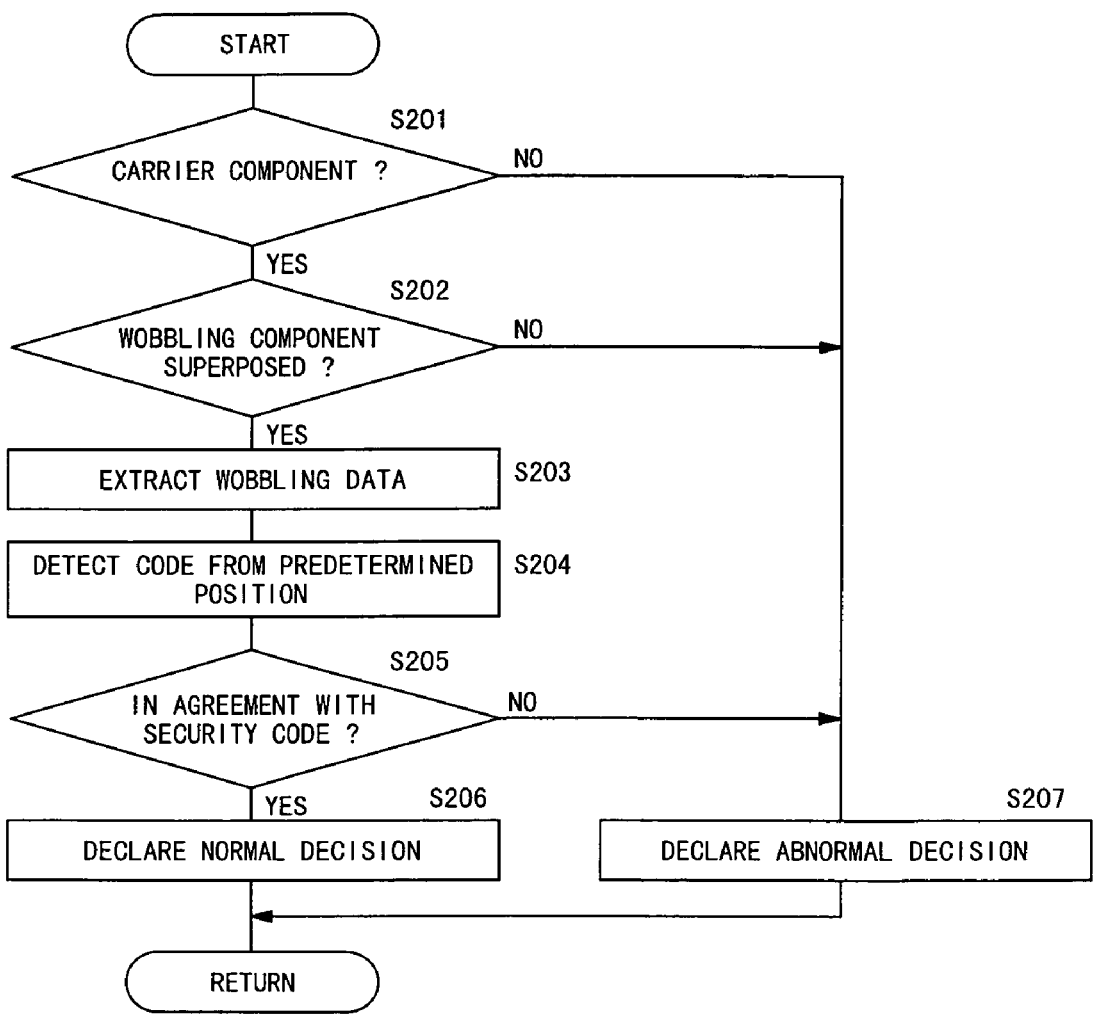
FIG. 6 is a flowchart of an authentication decision process.

In the authentication decision process, the modulated component detecting means 102 decides whether the carrier component of 22.05 kHz is present in the RF signal $S_{RF}$ which is read from the optical disk 12 by the optical pickup 22 in step S201 shown in FIG. 6.

If the carrier component of 22.05 kHz is present in the RF signal $S_{RF}$, then control proceeds to step S202. If the carrier component of 22.05 kHz is not present in the RF signal $S_{RF}$, then control goes to step S207 in which an abnormal decision is declared.

In step S202, the modulated component detecting means 102 decides whether a wobbling component is superposed on the carrier component or not. If a wobbling component is superposed on the carrier component, then control proceeds to step S203. If a wobbling component is not superposed on the carrier component, then control goes to step S207 in which an abnormal decision is declared.

In step S203, the modulated component detecting means 102 demodulates the carrier component to extract the wobbling component, producing wobbling data Dw.

In step S204, the detecting means 104 detects data (code Dc) indicated by the positional data stored in the first register 130, of the wobbling data Dw.

In step S205, the authentication decision means 106 decides whether the detected code Dc is in agreement with the security code Ds stored in the register 134 or not, i.e., whether the optical disk 12 is a legitimate disk or not.

If the detected code Dc is in agreement with the security code Ds, then control proceeds to step S206 in which a normal decision is declared. If the detected code Dc is not in agreement with the security code Ds, then control goes to step S207 in which an abnormal decision is declared.

Referring back to the routine shown in FIG. 5, the disk playback controller 28 issues a command to end the absolute authentication to the CPU 42 in step S107. Based on the command to end the authentication, the CPU 42 controls the security code detector 24 to output the decided result to the disk playback controller 28.

The absolute decision means 110 makes a decision according to the first rule in step S108. If the decided result from the authentication decision means 106 indicates a normal decision, then control proceeds to step S109 in which normal authentication is declared, after which the absolute authentication process is finished.

If the decided result from the authentication decision means 106 indicates an abnormal decision, then control goes to step S110. In step S110, the disk playback controller 28 decides whether the optical disk 12 is an audio disk or not based on the data recorded in the TOC area of the optical disk 12.

If the optical disk 12 is not an audio disk, then control goes to step S111 in which abnormal authentication is declared, after which the absolute authentication process is finished.

If the optical disk 12 is an audio disk in step S110, then control proceeds to step S112.

In step S112, the disk playback controller 28 resets a disk playback condition for the optical disk 12 to an audio playback mode, and plays back the optical disk 12. The audio signal output terminal 44 shown in FIG. 1 outputs an audio signal, and the absolute authentication process is finished. At this stage, control leaves the authentication process, and enters an audio signal processing mode.

Referring back to the main routine shown in FIG. 4, the authentication signal decision means 118 decides whether the absolute authentication process has resulted in normal authentication or abnormal authentication in step S2. If the absolute authentication process has resulted in normal authentication, then control proceeds to step S3 in which the authentication signal decision means 118 outputs signal Sd indicative of the execution/continuation of a program (in this case, a signal for activating a program) to the program executing means 116. In response to the signal Sd, the program executing means 116 transfers main data delivered from the disk access mechanism 14 to the main memory (not shown).

In step S4, the display controller 36 displays an image indicative of normal authentication on a display screen 50 (see FIG. 9) of the display unit 34 based on an instruction from the program executing means 116.

Figure 9:
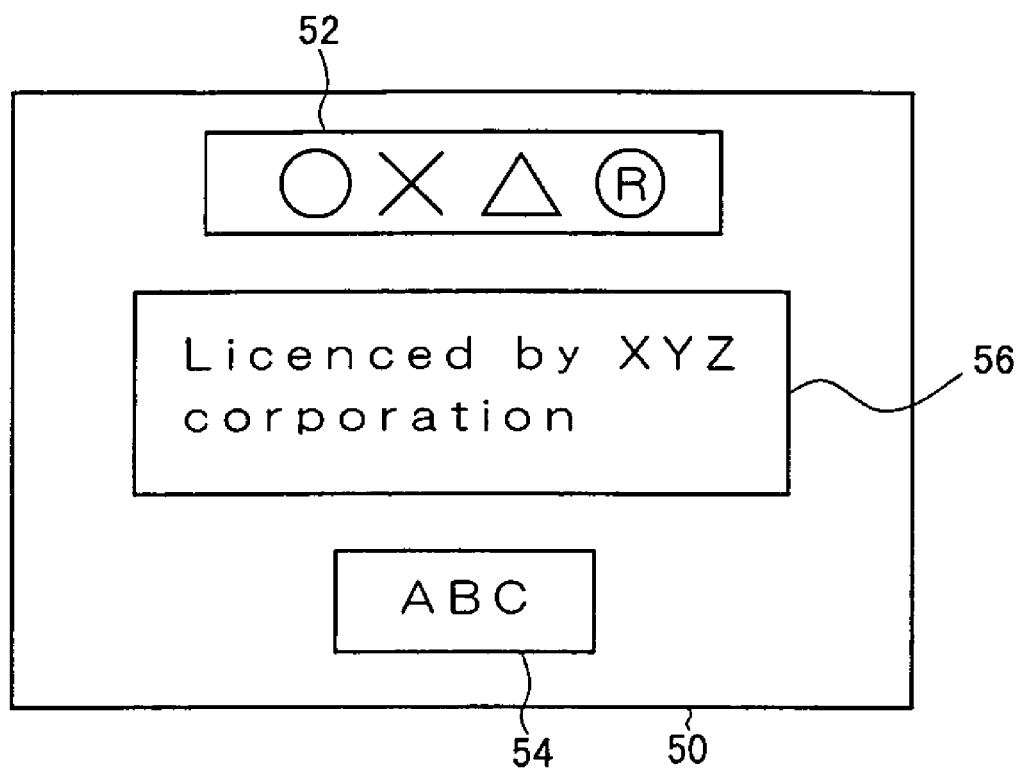
FIG. 9 is a view of an image displayed on the display screen of a display unit.

For example, as shown in FIG. 9, the displayed image includes a title 52 of a game program read from the optical disk 12, a string of letters 54 to be checked, such as an ID number of the optical disk 12, and a sentence 56 giving a license statement.

After the image has been displayed, control proceeds to step S5 in which a game program, for example, stored in the main memory is executed.

In step S6, the arbitrary authentication process is carried out. The arbitrary authentication process is performed when the program executing means 116 periodically or temporarily outputs an activation instruction signal Sa to the arbitrary authentication activating means 114.

The arbitrary authentication process will be described below with reference to FIGS. 7 and 8.

First, a present status of the CPU 42 is acquired in step S301. The disk playback controller 28 controls the playback of the optical disk 12 under the control of the CPU 42. The operation of the optical disk 12 under the control of the CPU 42 can thus be changed by issuing a command from the disk playback controller 28 to the CPU 42.

Specifically, it is determined in step S301 that the present status of the CPU 42 is in a read mode, a play mode, a seek mode, an error mode, or a spindle rotation mode. The processing of step S301 is carried out when the disk playback controller 28 issues a command for acquiring the present status of the CPU 42 to the CPU 42.

Then, in step S302, the disk playback controller 28 checks the present status of the CPU 42 which has been acquired in step S301. If the present status of the CPU 42 is in either the read mode, the play mode, or the seek mode, then the arbitrary authentication process comes to an end.

If the present status of the CPU 42 is in neither the read mode, the play mode, nor the seek mode, then control proceeds to step S303.

In step S303, it is decided whether the spindle motor 18 is rotating or not based on the present status of the CPU 42 which has been acquired in step S301. If the spindle motor 18 is rotating, then control proceeds to step S305.

If the spindle motor 18 is not rotating, then control proceeds to step S304 in which a command to rotate the spindle motor 18 is issued to the CPU 42. Thereafter, control proceeds to step S305. In response to the issued command, the CPU 42 controls the motor drive controller 20 to energize the spindle motor 18.

In step S305, the playback instructing means 108 indicates an arbitrary start position (an access position stored in the second register 142) on a recording track of the optical disk 12, and issues a seek command for causing the optical pickup 22 to seek the access position to the CPU 42.

Then, in step S306, the disk playback controller 28 issues a rotation command for setting a mode of the CPU 42 to a standard speed to the CPU 42.

In step S307, the CPU 42 controls the motor drive controller 20 to energize the spindle motor 18 based on the rotation command issued in step S306. The CPU 42 also controls the head drive controller 40 based on the seek command issued in step S307 to cause the head actuator 38 to move the optical pickup 22 radially across the optical disk 12 until the optical pickup 22 moves to the start position indicated by the seek command.

Then, the disk playback controller 28 issues a playback command to the CPU 42 to play back the optical disk 12 from the indicated start position in step S308.

In step 309, the disk playback controller 28 issues a command to start arbitrary authentication to the CPU 42.

In step S310, an actual authentication decision process is performed on the basis of the command to start the arbitrary authentication.

The authentication decision process is carried out in substantially the same manner as shown in FIG. 6. Specifically, the detecting means 104 detects wobbling data (code Dc) indicated by the positional data stored in the second register 132, of the RF signal $S_{RF}$ outputted from the optical pickup 22, and the authentication decision means 106 decides whether the detected code Dc is in agreement with the security code Ds or not.

In the position indicated in the arbitrary authentication process, the security code Ds may not be recorded, and the carrier component of 22.05 kHz may not be present. Therefore, the authentication decision means 106 makes an abnormal decision.

Figure 7:
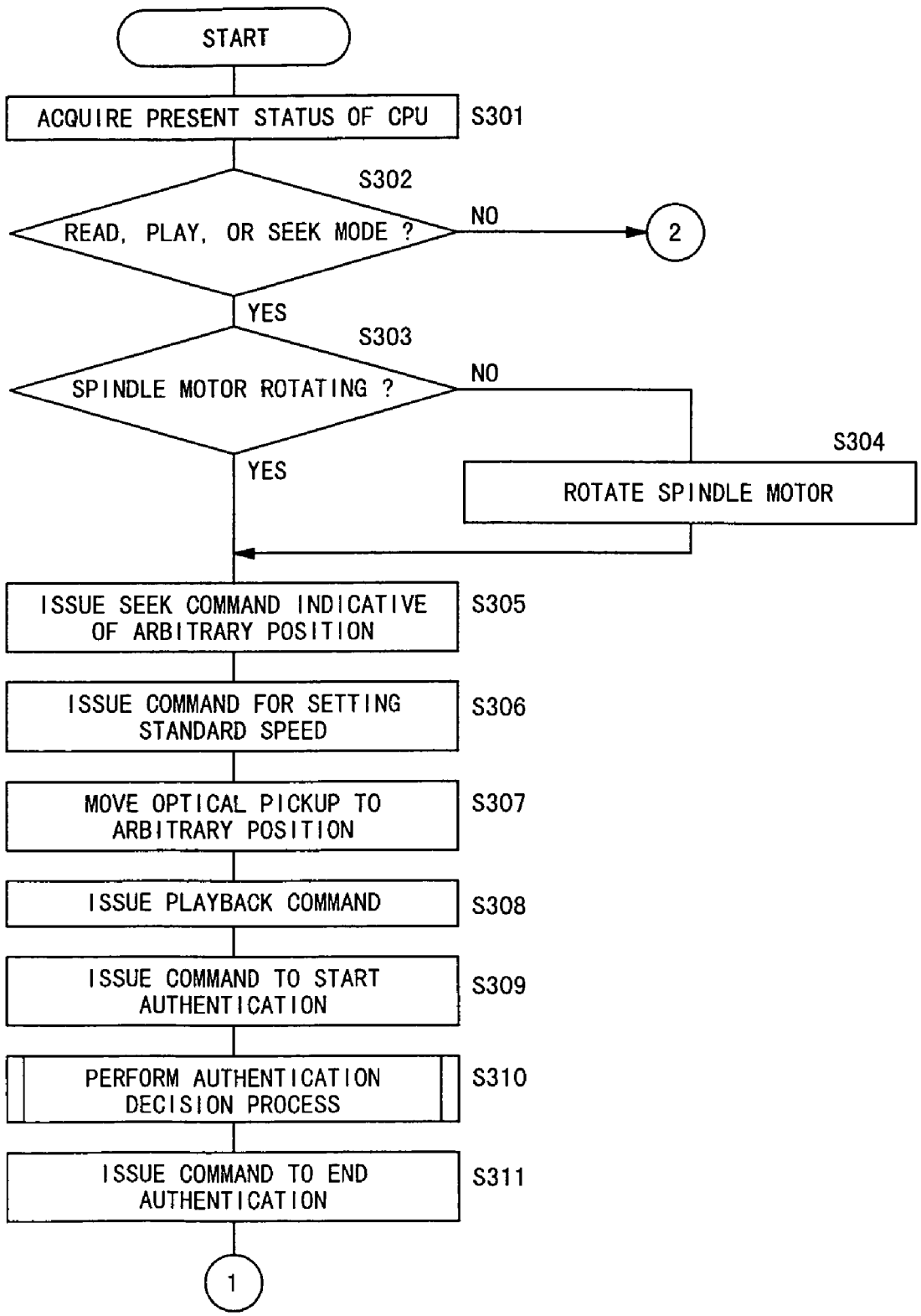
FIGS. 7 and 8 are a flowchart of an arbitrary authentication process.

Referring back to the routine shown in FIG. 7, the disk playback controller 28 issues a command to end the arbitrary authentication to the CPU 42 in step S311. Based on the command to end the authentication, the CPU 42 controls the security code detector 24 to output the decided result to the disk playback controller 28.

Figure 8:
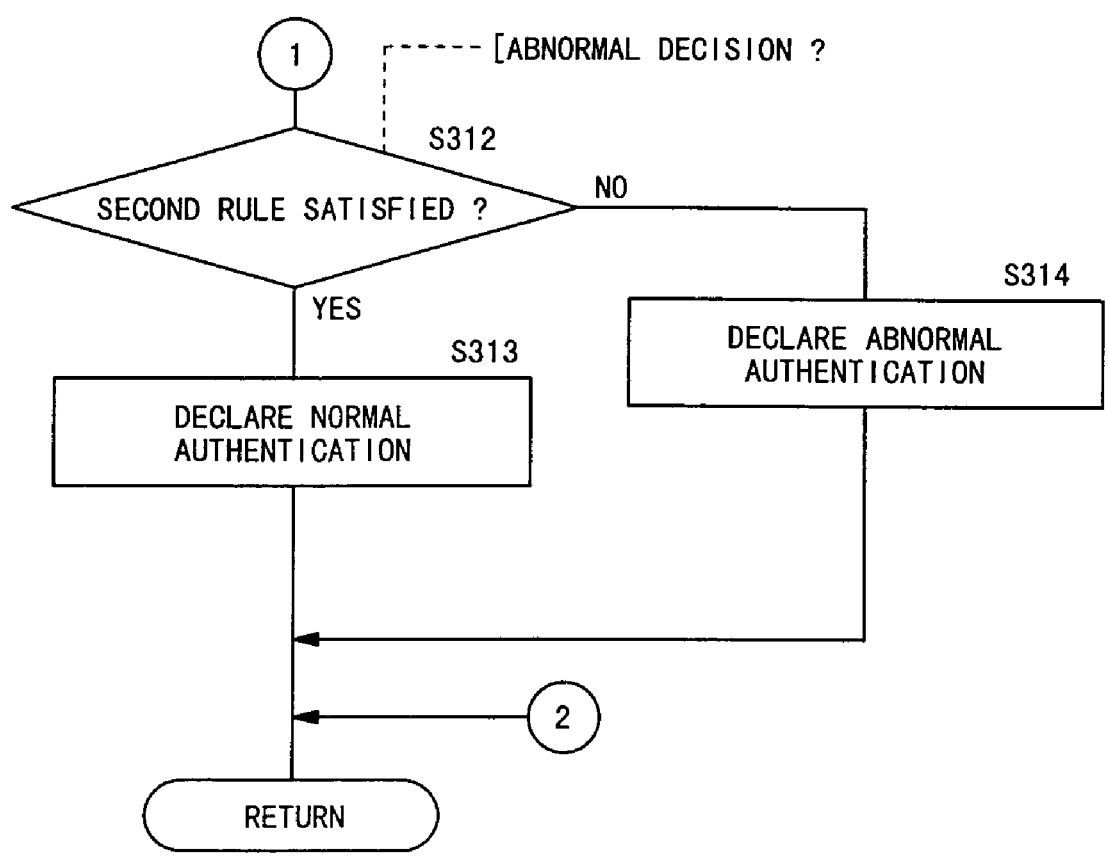

The arbitrary decision means 112 makes a decision according to the second rule in step S312 shown in FIG. 8.

If the decided result from the authentication decision means 106 indicates an abnormal decision, then control proceeds to step S313 in which normal authentication is declared, after which the arbitrary authentication process is finished. If the decided result from the authentication decision means 106 indicates a normal decision, then control proceeds to step S314 in which abnormal authentication is declared, after which the arbitrary authentication process is finished.

In step S7 of the main routine shown in FIG. 4, the authentication signal decision means 118 decides whether the arbitrary authentication process has resulted in normal authentication or abnormal authentication. If the arbitrary authentication process has resulted in normal authentication, then control goes back to step S5 in which the authentication signal decision means 118 outputs a signal Sd indicative of the execution/continuation of a program (in this case, a signal for continuing a program) to the program executing means 116. In response to the signal Sd, the program executing means 116 continues the execution of the program which is currently being activated.

If the absolute authentication process has resulted in abnormal authentication in step S2 or the arbitrary authentication process has resulted in abnormal authentication in step S7, then control proceeds to step S8 in which the authentication signal decision means 118 outputs a signal Se indicative of the forced ending of a program to the forced ending means 120.

In response to the signal Se, the forced ending means 120 instructs the display controller 36 to display an image representative of abnormal authentication. The display controller 36 controls the display unit 34 to display an image representative of abnormal authentication on the display screen 50. For example, the display unit 34d displays a message "THIS DISK CANNOT BE USED", for example.

In step S9, the forced ending means 120 issues a forced ending interrupt to the program executing means 116. In response to the forced ending interrupt, the program executing means 116 forcibly ends the program which is currently being executed, and interrupts the transfer of data. For example, the transfer of data to a memory such as a memory card which saves a temporary result of the game is interrupted, making it impossible to save or read data.

When the processing of step S9 is finished, the processing operation of the authenticating means 100 comes to an end.

Advantages offered by the authenticating means 100 will be described below. Heretofore, in terms of the routine shown in FIG. 4, it has been customary to carry out only the absolute authentication process in step S1.

Specifically, when a game program is activated, data written in a certain area of the optical disk 12 is read to effect authentication. If authentication is normal, then control goes to step S5 to start executing the game program. If authentication is not normal, then the game program does not start being executed.

Therefore, if a special device for generating authentication data at all times is connected to the video game apparatus, then it is possible to make authentication normal at all times. If a special device for inputting a signal indicative of normal authentication is connected to the disk playback controller 28, then it is also possible to make authentication normal at all times.

If such a special device is used, then it returns an authentication result indicating that authentication data has been read normally no matter which area of the optical disk 12 may be read.

According to the embodiment of the present invention, the optical disk 12 is authenticated in an arbitrary area at an arbitrary time (the arbitrary authentication process: step S6) in addition to the above authentication process (the absolute authentication process).

Specifically, since authentication data is written in only a certain area of the optical disk 12, no authentication data can be read when an arbitrary area of the optical disk 12 is read. If a special device for generating authentication data at all times is connected to the video game apparatus, then it returns an authentication result indicating that authentication data has been read normally though in fact it cannot read authentication data from the optical disk 12. Based on the above principles, it is decided whether such a special device is connected or not for authentication of the optical disk 12. The arbitrary area referred to above is an area except a given position on the optical disk 12 where authentication data is recorded.

If the arbitrary authentication process results in normal authentication, i.e., the decided result from the authentication decision means 106 indicates an abnormal decision, then control returns to step S5, and the game program is continuously executed.

If the arbitrary authentication process results in abnormal authentication, i.e., the decided result from the authentication decision means 106 indicates a normal decision, then the game is interrupted or the transfer of data is interrupted, so that data can be prevented from being read or saved and the game program that is currently being executed can forcibly be ended. At this time, the display screen 50 of the display unit 34 displays a message "THIS DISK CANNOT BE USED", for example.

Therefore, even if a special device which can normally authenticate an optical disk 12 that should not be authenticated normally is connected to the video game apparatus 10, the optical disk 12 that should not be authenticated normally or the special device can reliably be detected to forcibly interrupt any process being carried out, e.g., the transfer of data to the main memory or the execution of a game program. As a consequence, the optical disk 12 can effectively be prevented from being illegally copied.

The authenticating means 100 may be provided as a library function or may be called and executed in a program of application software.

The arbitrary position indicated in the arbitrary authentication process corresponds to an address. The address may freely be established as a parameter of a called library function and stored in the second registers 132, 142.

Inasmuch as the address can freely be established at the developmental stage of application software, it can be established differently for every title, every lot, and every N pieces of application software for a powerful copy prevention function.

Figure 10:
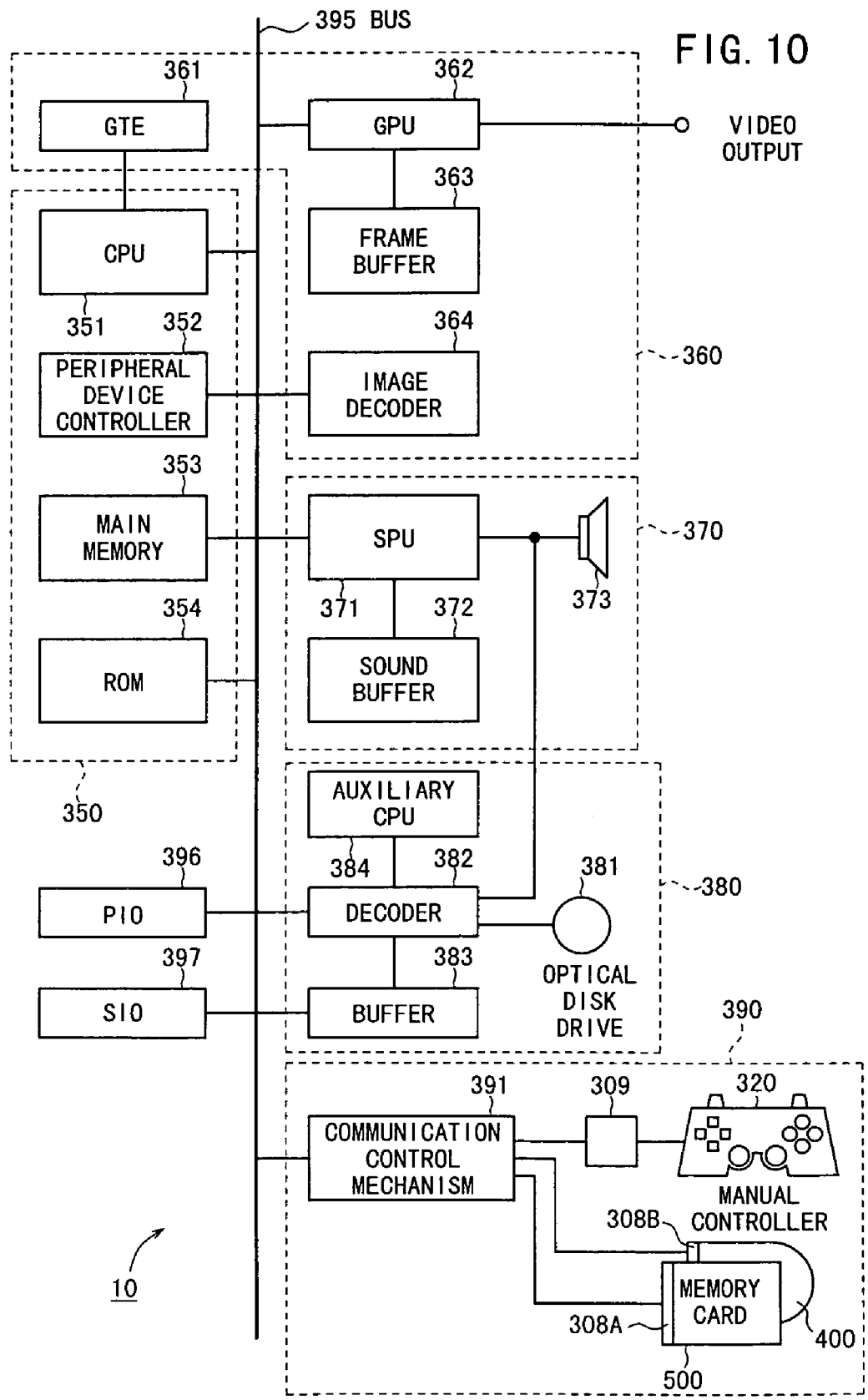
FIG. 10 is a block diagram of an overall arrangement of the video game apparatus.

An overall circuit arrangement of the video game apparatus 10 will be described below with reference to FIG. 10. The circuit of the video game apparatus 10 shown in FIG. 1 is a simplified circuit arrangement of the video game apparatus 10, and corresponds to the overall circuit of the video game apparatus 10 shown in FIG. 10 as follows:

The optical disk 12, the spindle motor 18, the motor drive controller 20, the optical pickup 22, the head actuator 38, and the head drive controller 40 shown in FIG. 1 correspond to an optical disk drive 381 shown in FIG. 10. The interface 32 shown in FIG. 1 corresponds to a PIO 396 and an SIO 387 shown in FIG. 10. The display controller 36 shown in FIG. 1 corresponds to a GPU 362 shown in FIG. 10. The CPU 42 shown in FIG. 1 corresponds to a CPU 351 shown in FIG. 10.

The video game apparatus 10 reads an application program from the optical disk 12, and executes the application program according to instructions from the user, i.e., the game player. For example, the video game apparatus 10 executes a game program mainly to control the progress of a game, the display of game images, and the output of sounds.

The video game apparatus 10 comprises a control system 350 including a central processing unit (CPU) 351 and its peripheral devices, a graphic system 360 including a graphic processing unit (GPU) 362 for generating and storing image data in a frame buffer 363, a sound system 370 including a sound processing unit (SPU) 371 for generating music sounds and sound effects, an optical disk controller 380 for controlling an optical disk in which application programs are recorded, a communication controller 390 for controlling signals from a manual controller 320 as an input means for entering instructions from the user, and data supplied to and from a memory card 500 which stores game settings and a portable electronic device 400, a bus 395 to which the control system 350, the graphic system 360, the sound system 370, the optical disk controller 380, and the communication controller 390 are connected, and a parallel I/O interface (PIO) 396 and a serial I/O interface (SIO) 397 which interface another apparatus.

The control system 350 comprises a CPU 351, a peripheral device controller 352 for controlling interrupts and direct memory access (DMA) data transfer, a main memory 353 comprising a random-access memory (RAM), and a read-only memory (ROM) 354 for storing various programs such as an operating system or the like for managing the main memory 353, the graphic system 360, and the sound system 370.

The CPU 351 controls the video game apparatus 10 in its entirety by executing the operating system stored in the ROM 354.

When the video game apparatus 10 is turned on, the CPU 351 executes the operating system stored in the ROM 354 to start controlling the graphic system 360, the sound system 370, etc. For example, when the operating system is executed, the CPU 351 initializes the video game apparatus 301 in its entirety for confirming its operation, and thereafter controls the optical disc controller 380 to execute an application program recorded in the optical disk 12. As the application program is executed, the CPU 351 controls the graphic system 360, the sound system 370, etc. depending on instructions entered from the user for thereby controlling the display of images and the generation of music sounds and sound effects.

In the control system 350, mainly the CPU 351 carries out the above authentication processes to decide whether the optical disk is legitimate or not to prevent data from being played back from an optical disk that is not legitimate.

The graphic system 360 comprises a geometry transfer engine (GTE) 361 for performing coordinate transformations and other processing, a graphic processing unit (GPU) 362 for generating image data according to commands from the CPU 351, a frame buffer 363 for storing image data generated by the GPU 362, and an image decoder 364 for decoding image data compressed and encoded by an orthogonal transform such as a discrete cosine transform.

The GTE 361 has a parallel arithmetic mechanism for performing a plurality of arithmetic operations parallel to each other, and can perform coordinate transformations, light source calculations, matrixes, or vectors at a high speed in response to a request from the CPU 351. Specifically, the GTE 361 can calculate the coordinates of a maximum of 1.5 million polygons per second for a flat shading process for plotting one triangular polygon with one color, for example. With the GTE 361, the video game apparatus 301 is able to reduce the burden on the CPU 351 and perform high-speed coordinate calculations.

According to an image generating command from the CPU 351, the GPU 362 generates and stores a polygon or the like in the frame buffer 363. The GPU 362 is capable of generating a maximum of 360 thousand polygons per second.

The frame buffer 363 comprises a dual-port RAM, and is capable of simultaneously storing image data generated by the GPU 362 or image data transferred from the main memory 353, and reading image data for display. The frame buffer 363 has a storage capacity of 1 Mbytes, for example, and is handled as a 16-bit matrix made up of a horizontal row of 1024 pixels and a vertical column of 512 pixels.

The frame buffer 363 has a display area for storing image data to be outputted as video output data, a CLUT (color look-up table) area for storing a color look-up table which will be referred to by the GPU 362 when it generates a polygon or the like, and a texture area for storing texture data to be subjected to coordinate transformations when a polygon is generated and mapped onto a polygon plotted by the GPU 362. The CLUT area and the texture area are dynamically varied as the display area is varied.

The image decoder 364 is controlled by the CPU 351 to decode image data of a still or moving image stored in the main memory 353, and store the decoded image into the main memory 353. Image data reproduced by the image decoder 364 is transferred to the frame buffer 363 by the GPU 362, and can be used as a background for an image plotted by the GPU 362.

The sound system 370 comprises an SPU 371 for generating music sounds, sound effects, etc. based on commands from the CPU 351, a sound buffer 372 for storing waveform data from the SPU 371, and a speaker 373 for outputting music sounds, sound effects, etc. generated by the SPU 371.

The SPU 371 has an ADPCM (adaptive differential PCM) function for reproducing 16-bit sound data which has been encoded as 4-bit differential sound data by ADPCM, a reproducing function for reproducing the waveform data stored in the sound buffer 372 to generate sound effects, etc., and a modulating function for modulating and reproducing the waveform data stored in the sound buffer 372.

The sound system 370 can be used as a sampling sound source which generates music sounds, sound effects, etc. based on the waveform data stored in the sound buffer 372 according to commands from the CPU 351.

The optical disk controller 380 comprises an optical disk drive 381 for reproducing application programs and data recorded on an optical disk such as a CD-ROM or the like, a decoder 382 for decoding programs and data that are recorded with an error correcting code added thereto, and a buffer 383 for temporarily storing data read from the optical disk drive 381 so as to allow the data from the optical disk to be read at a high speed. An auxiliary CPU 384 is connected to the decoder 382.

Sound data recorded on the optical disk which is read by the optical disk drive 381 includes PCM data converted from analog sound signals, in addition to the ADPCM data. The ADPCM data, which is recorded as 4-bit differential data of 16-bit digital data, is decoded by the decoder 382, supplied to the SPU 371, converted thereby into analog data, and applied to drive the speaker 373. The PCM data, which is recorded as 16-bit digital data, is decoded by the decoder 382 and then applied to drive the speaker 373.

The optical disk for use in the optical disk drive 381 may be a so-called CD-ROM, for example. At least programs and image data for use in the video game are recorded in the optical disk.

The communication controller 390 comprises a communication control mechanism 391 for controlling communication with the CPU 351 via the bus 395, a controller connector 309 to which the manual controller 320 for entering instructions from the user is connected, and a pair of memory card insertion units or slots 308A, 308B for receiving the memory card 500 as an auxiliary memory device for storing game settings, etc. and the portable electronic device 400, the memory card insertion units 308A, 308B being controlled by the communication control mechanism 391.

The video game apparatus 10 is capable of performing a video game based on a game program recorded in the optical disk 12 that is loaded in the optical disk controller 380.

Figure 11:
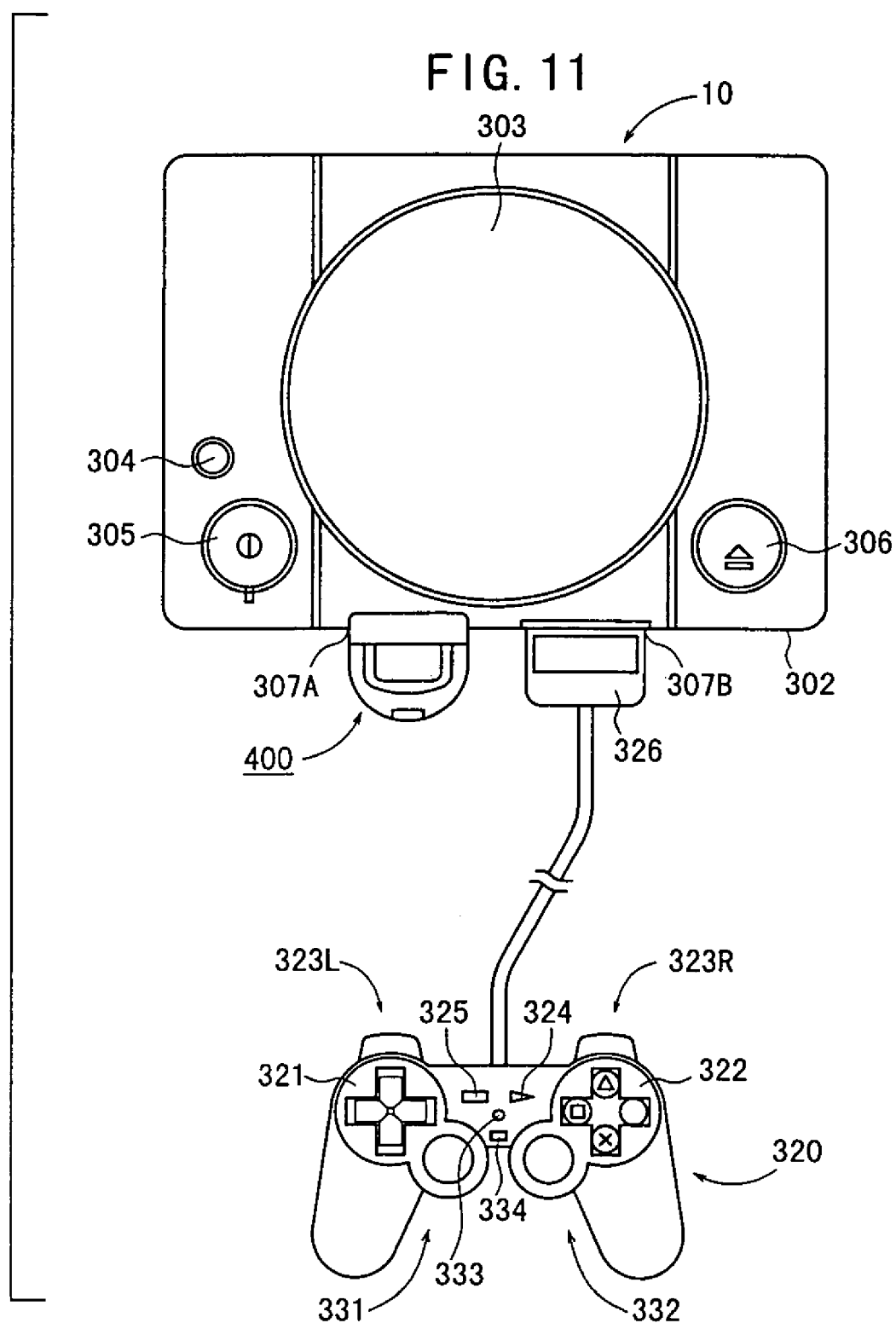
FIG. 11 is a plan view of the video game apparatus.
Figure 12:
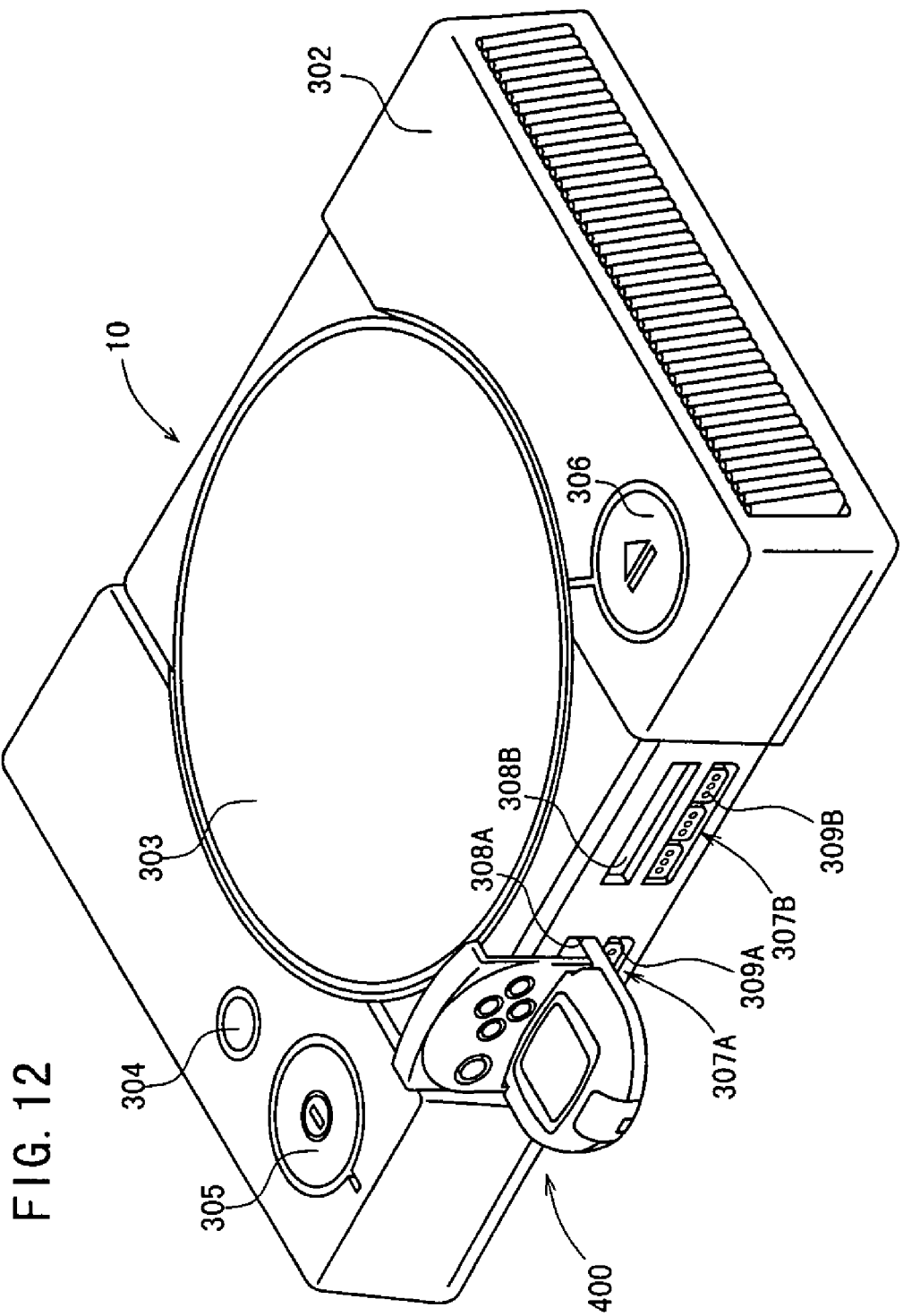
FIG. 12 is a perspective view of the video game apparatus.

Outer structural details of the video game apparatus 10 will be described below with reference to FIGS. 11 and 12.

The video game apparatus 10 has a rectangular casing 302 which houses a disk loading unit 303 substantially centrally therein for loading an optical disk such as a CD-ROM or the like as a recording medium for supplying application programs including video games. The casing 302 supports a reset switch 304 for resetting a video game, a power supply switch 305, a disk control switch 306 for controlling the loading of the optical disk 12, and two slots assemblies 307A, 307B.

The video game apparatus 10 may be supplied with application programs via a communication link, rather than being supplied from the optical disk 12.

The portable electronic device 400 and the manual controller 320 can be connected to the slot assemblies 307A, 307B. A memory card system may also be connected to the slots assemblies 307A, 307B.

The manual controller 320 has first and second control pads 321, 322, a left button 323L, a right button 323R, a start button 324, a selector button 325, analog control pads 331, 332, a mode selector switch 333 for selecting control modes for the analog control pads 331, 332, and an indicator 334 for indicating a selected control mode.

The manual controller 320 also has a vibration imparting mechanism (not shown) disposed therein for imparting vibrations to the manual controller 320 depending on how the video game proceeds. The manual controller 320 is electrically connected to the slot assembly 307B in the casing 302 by a connector 326.

If two manual controllers 320 are connected respectively to the slot assemblies 307A, 307B, two users or game players can share the entertainment system to play a competition game, for example. The video game apparatus 301 may have more or less than two slot assemblies 307A, 307B.

The portable electronic device 400 has a control means and a memory means therein, and can perform a predetermined operation sequence either independently or in combination with the video game apparatus 10. For example, the portable electronic device 400 uploads data to and downloads data from the video game apparatus 10, and performs a game while being connected to the video game apparatus 10.

In the illustrated embodiment, the main data are modulated according to EFM and then recorded as pits on the optical disk 12. However, the main data may be modulated according to another modulating process and then recorded on the optical disk 12.

In the illustrated embodiment, pits and grooves are modulated radially of the optical disk 12 according to the NRZ modulating process. However, pits and grooves may be modulated radially of the optical disk 12 according to another modulating process. In the illustrated embodiment, pits and grooves are modulated radially of the optical disk using the carrier component of 22.05 kHz. However, pits and grooves may be modulated radially of the optical disk 12 using a carrier component of another frequency.

The main data transferred to the program execution controller 16 has been illustrated as data representing certain game contents. However, main data transferred to the program execution controller 16 may be data representing other program contents.

While the main data has been illustrated as data representing an operation program, the main data may be data for performing a certain processing sequence, e.g., image data. If the main data is such data, then the program execution controller 16 executes a program for performing the above certain processing sequence to process the main data.

The data to be displayed on the display screen of the display unit 34 has been illustrated as the title 52 of a game program read from the optical disk 12, the string of letters 54 to be checked, such as an ID number of the optical disk 12, and the sentence 56 giving a license statement. However, the data to be displayed on the display screen of the display unit 34 may be various other data.

Although a certain preferred embodiment of the present invention have been shown and described in detail, it should be understood that various changes and modifications may be made therein without departing from the scope of the appended claims.

What is claimed is:

1. A method of authenticating a recording medium and a disk playback apparatus, comprising the steps of
    performing an absolute authentication process for authenticating a recording medium with information for authentication being recorded in a predetermined position therein, according to a first rule at a predetermined time, wherein said first rule is that normal authentication is declared in said absolute authentication process if the information for authentication is detected as being recorded in said predetermined position;
    executing a program transferred from said recording medium if normal authentication is declared in said absolute authenticating process; and
    performing an arbitrary authentication process for authenticating a disk playback apparatus according to a second rule at an arbitrary time while executing said program, wherein said second rule is that normal authentication is declared in said arbitrary authentication process if the information for authentication is not detected in arbitrary positions other than said predetermined position,
    wherein said absolute authentication process is performed when said recording medium starts being accessed for the first time, and said arbitrary authentication process is performed at least once after said absolute authentication process.

2. A method according to claim 1, wherein said absolute authentication process comprises an authentication information detecting process for detecting the information recorded in said predetermined position when said recording medium starts being accessed, and an absolute decision process for declaring normal authentication if the detected information comprises information for authentication, and said arbitrary authentication process comprises an arbitrary information detecting process for detecting information from an arbitrary position except said predetermined position on said recording medium, and an arbitrary decision process for declaring normal authentication if the detected information does not comprise information for authentication.

3. A method according to claim 1, wherein said first rule in said absolute authentication process includes that normal authentication is declared if a signal indicating that the information for authentication is recorded in said predetermined position is received, and said second rule in said arbitrary authentication process includes that normal authentication is declared if a signal indicating that the information for authentication is not recorded is received.

4. A method according to claim 3, further comprising the step of employing access means for accessing said recording medium and outputting a normal signal if the information for authentication is recorded in said predetermined position, said absolute authentication process comprising an absolute decision process for declaring normal authentication if said normal signal is received, and said arbitrary authentication process comprising an arbitrary decision process for declaring an abnormal authentication if said normal signal is received.

5. A method according to claim 1, wherein said recording medium comprises a disk-type recording medium, the information for authentication being modulated radially of said recording medium and recorded therein.

6. A method according to claim 1, wherein said recording medium comprises a disk-type recording medium, the information for authentication being modulated radially of said recording medium and recorded therein, and wherein said absolute authentication process and said arbitrary authentication process comprise the steps of:
    detecting a modulated component from said recording medium;
    detecting the information for authentication from said modulated component; and
    deciding whether the detected information for authentication is in agreement with predetermined information and recorded in said predetermined position, and outputting a normal signal if the detected information for authentication is in agreement with predetermined information and recorded in said predetermined position.

7. A method according to claim 4, wherein said recording medium comprises a disk-type recording medium, the information for authentication being modulated radially of said recording medium and recorded therein, and wherein said access means comprises means for performing the steps of:
    detecting a modulated component from said recording medium;
    detecting the information for authentication from said modulated component; and
    deciding whether the detected information for authentication is in agreement with predetermined information and recorded in said predetermined position, and outputting a normal signal if the detected information for authentication is in agreement with predetermined information and recorded in said predetermined position.

8. A method according to claim 1, further comprising the step of forcibly ending a processing being executed if either said absolute authentication process or said arbitrary authentication process does not result in normal authentication.

9. A method according to claim 1, further comprising the step of displaying information representing an authenticated result of either said absolute authentication process or said arbitrary authentication process.

10. A disk playback apparatus for playing back information on a disk-type recording medium, comprising:
    absolute authentication means for performing an absolute authentication process for authenticating a recording medium with information for authentication being recorded in a predetermined position therein, according to a first rule at a predetermined time, wherein said first rule is that normal authentication is declared in said absolute authentication process if the information for authentication is detected as being recorded in said predetermined position;
    executing means for executing a program transferred from said recording medium if normal authentication is declared in said absolute authenticating process; and
    arbitrary authentication means for performing an arbitrary authentication process for authenticating said disk playback apparatus according to a second rule at an arbitrary time while said program is executing, wherein said second rule is that normal authentication is declared in said arbitrary authentication process if the information for authentication is not detected in arbitrary positions other than said predetermined position,
    wherein said absolute authentication means comprises means for performing said absolute authentication process according to said first rule when said recording medium starts being accessed for the first time, and said arbitrary authentication means comprises means for performing said arbitrary authentication process according to said second rule at least once after said absolute authentication process.

11. A disk playback apparatus according to claim 10, wherein said absolute authentication means comprises authentication information detecting means for detecting the information recorded in said predetermined position when said recording medium starts being accessed, and absolute decision means for declaring normal authentication if the detected information comprises information for authentication, and said arbitrary authentication means comprises arbitrary information detecting means for detecting information from an arbitrary position except said predetermined position on said recording medium, and arbitrary decision means for declaring normal authentication if the detected information does not comprise information for authentication.

12. A disk playback apparatus according to claim 10, wherein said first rule in said absolute authentication process performed by said absolute authentication means includes that normal authentication is declared if a signal indicating that the information for authentication is recorded in said predetermined position is received, and said second rule in said arbitrary authentication process performed by said arbitrary authentication means includes that normal authentication is declared if a signal indicating that the information for authentication is not recorded is received.

13. A disk playback apparatus according to claim 12, further comprising:
    access means for accessing said recording medium and outputting a normal signal if the information for authentication is recorded in said predetermined position;
    said absolute authentication means comprising absolute decision means for declaring normal authentication if said normal signal is received; and
    said arbitrary authentication means comprising arbitrary decision means for declaring an abnormal authentication if said normal signal is received.

14. A disk playback apparatus according to claim 10, wherein the information for authentication is modulated radially of said recording medium and recorded therein.

15. A disk playback apparatus according to claim 10, wherein the information for authentication is modulated radially of said recording medium and recorded therein, and wherein said absolute authentication means and said arbitrary authentication means comprise:
    modulated component detecting means for detecting a modulated component from said recording medium;
    detecting means for detecting the information for authentication from said modulated component; and
    authentication decision means for deciding whether the detected information for authentication is in agreement with predetermined information and recorded in said predetermined position, and outputting a normal signal if the detected information for authentication is in agreement with predetermined information and recorded in said predetermined position.

16. A disk playback apparatus according to claim 13, wherein the information for authentication is modulated radially of said recording medium and recorded therein, and wherein said access means comprises:
    modulated component detecting means for detecting a modulated component from said recording medium;
    detecting means for detecting the information for authentication from said modulated component; and
    authentication decision means for deciding whether the detected information for authentication is in agreement with predetermined information and recorded in said predetermined position, and outputting a normal signal if the detected information for authentication is in agreement with predetermined information and recorded in said predetermined position.

17. A disk playback apparatus according to claim 10, further comprising means for forcibly ending a processing being executed if either said absolute authentication process performed by said absolute authentication means or said arbitrary authentication process performed by said arbitrary authentication means does not result in normal authentication.

18. An entertainment apparatus for performing processing operations using programs and data reproduced from a recording medium, comprising:
absolute authentication means for performing an absolute authentication process for authenticating a recording medium with information for authentication being recorded in a predetermined position therein, according to a first rule at a predetermined time, wherein said first rule is that normal authentication is declared in said absolute authentication process if the information for authentication is detected as being recorded in said predetermined position;
executing means for executing a program transferred from said recording medium if normal authentication is declared in said absolute authenticating process; and
arbitrary authentication means for performing an arbitrary authentication process for authenticating said entertainment apparatus according to a second rule at an arbitrary time while said program is executing, wherein said second rule is that normal authentication is declared in said arbitrary authentication process if the information for authentication is not detected in arbitrary positions other than said predetermined positions,
wherein said absolute authentication means comprises means for performing said absolute authentication process according to said first rule when said recording medium starts being accessed for the first time, and said arbitrary authentication means comprises means for performing said arbitrary authentication process according to said second rule at least once after said absolute authentication process.

19. An entertainment apparatus according to claim 18, wherein said absolute authentication means comprises authentication information detecting means for detecting the information recorded in said predetermined position when said recording medium starts being accessed, and absolute decision means for declaring normal authentication if the detected information comprises information for authentication, and said arbitrary authentication means comprises arbitrary information detecting means for detecting information from an arbitrary position except said predetermined position on said recording medium, and arbitrary decision means for declaring normal authentication if the detected information does not comprise information for authentication.

20. An entertainment apparatus according to claim 18, wherein said first rule in said absolute authentication process performed by said absolute authentication means includes that normal authentication is declared if a signal indicating that the information for authentication is recorded in said predetermined position is received, and said second rule in said arbitrary authentication process performed by said arbitrary authentication means includes that normal authentication is declared if a signal indicating that the information for authentication is not recorded is received.

21. An entertainment apparatus according to claim 20, further comprising:
access means for accessing said recording medium and outputting a normal signal if the information for authentication is recorded in said predetermined position;
said absolute authentication means comprising absolute decision means for declaring normal authentication if said normal signal is received; and
said arbitrary authentication means comprising arbitrary decision means for declaring an abnormal authentication if said normal signal is received.

22. An entertainment apparatus according to claim 18, wherein said recording medium comprises a disk-type recording medium, the information for authentication being modulated radially of said recording medium and recorded therein.

23. An entertainment apparatus according to claim 18, wherein said recording medium comprises a disk-type recording medium, the information for authentication being modulated radially of said recording medium and recorded therein, and wherein said absolute authentication means and said arbitrary authentication means comprise:
modulated component detecting means for detecting a modulated component from said recording medium;
detecting means for detecting the information for authentication from said modulated component; and
authentication decision means for deciding whether the detected information for authentication is in agreement with predetermined information and recorded in said predetermined position, and outputting a normal signal if the detected information for authentication is in agreement with predetermined information and recorded in said predetermined position.

24. An entertainment apparatus according to claim 21, wherein said recording medium comprises a disk-type recording medium, the information for authentication being modulated radially of said recording medium and recorded therein, and wherein said access means comprises:
modulated component detecting means for detecting a modulated component from said recording medium;
detecting means for detecting the information for authentication from said modulated component; and
authentication decision means for deciding whether the detected information for authentication is in agreement with predetermined information and recorded in said predetermined position, and outputting a normal signal if the detected information for authentication is in agreement with predetermined information and recorded in said predetermined position.

25. A entertainment apparatus according to claim 18, further comprising means for forcibly ending a processing being executed if either said absolute authentication process performed by said absolute authentication means or said arbitrary authentication process performed by said arbitrary authentication means does not result in normal authentication.

26. An entertainment apparatus according to claim 18, further comprising display means for displaying information representing an authenticated result from either said absolute authentication means or said arbitrary authentication means.

* * * * *